US008000170B2

(12) United States Patent
Kablotsky

(10) Patent No.: US 8,000,170 B2
(45) Date of Patent: Aug. 16, 2011

(54) SYSTEMS AND METHODS FOR ACOUSTIC BEAMFORMING USING DISCRETE OR CONTINUOUS SPEAKER ARRAYS

(75) Inventor: Joshua A. Kablotsky, Carlisle, MA (US)

(73) Assignee: Analog Devices, Inc., Norwood, MA (US)

( * ) Notice: Subject to any disclaimer, the term of this patent is extended or adjusted under 35 U.S.C. 154(b) by 446 days.

(21) Appl. No.: 12/274,771

(22) Filed: Nov. 20, 2008

(65) Prior Publication Data

US 2010/0124150 A1 May 20, 2010

(51) Int. Cl.
*H04B 1/02* (2006.01)

(52) U.S. Cl. ........................................................ 367/138

(58) Field of Classification Search .................. 367/138; 381/387, 423, 77, 79, 80, 82
See application file for complete search history.

(56) References Cited

U.S. PATENT DOCUMENTS

| | | | | |
|---|---|---|---|---|
| 4,317,966 | A | 3/1982 | Lister | |
| 7,130,430 | B2 | 10/2006 | Milsap | |
| 2002/0012442 | A1 * | 1/2002 | Azima et al. | 381/431 |
| 2006/0159283 | A1 | 7/2006 | Mathew et al. | |
| 2006/0225509 | A1 | 10/2006 | Haupt et al. | |
| 2007/0025565 | A1 | 2/2007 | Kim et al. | |
| 2010/0124150 | A1 * | 5/2010 | Kablotsky | 367/138 |

FOREIGN PATENT DOCUMENTS

| | | | |
|---|---|---|---|
| WO | WO-96/07294 | A1 | 3/1996 |
| WO | WO-02/01911 | A1 | 1/2002 |

* cited by examiner

*Primary Examiner* — Dan Pihulic
(74) *Attorney, Agent, or Firm* — Knobbe Martens Olson & Bear LLP

(57) ABSTRACT

In various embodiments, the invention pertains to systems for acoustic beamforming that include one or more speaker membranes, such as, for example, a continuous ribbon membrane, and several independently addressable drivers. Moreover, certain embodiments relate to methods for beamforming with improved directionality.

17 Claims, 6 Drawing Sheets

SYSTEMS AND METHODS FOR ACOUSTIC BEAMFORMING USING DISCRETE OR CONTINUOUS SPEAKER ARRAYS

FIELD OF THE INVENTION

The invention relates generally to systems and methods for reproducing sound, and, more particularly, to phased array speaker systems for focusing sound into a specified region.

BACKGROUND

In phased arrays of antennas, the relative phases of the signals feeding the antennas are varied so that the effective radiation pattern of the array is enhanced in a desired region and suppressed in undesired directions. Phased-array technology was originally developed for radar systems, but has since also been used, for example, in radio astronomy, radio broadcasting, optical communication, sonar (sound navigation and ranging) systems, and loudspeaker systems for entertainment. In sound applications, phased arrays are often referred to as beamformers.

Beamforming techniques have supplemented the traditional functions of loudspeaker systems—sound amplification and reproduction with a given level of clarity and intelligibility—with the capability of containing sound waves in a beam aimed at one or more particular points or listeners. This capability enables providing sound at a desirable volume level to a target person, while keeping the volume in the surrounding area below (or at least not significantly above) the audible level, so as to avoid disturbing others. Acoustic beamforming can also be used to provide different audio stimuli to different people occupying the same room, e.g., a museum or lecture hall. Moreover, it can be employed to create more realistic stereo effects without the need for headphones, or more complex directional sound, for example, in home entertainment audio systems.

Existing audio beamforming systems suffer from a number of deficiencies and conflicting goals. Most notably, the effectiveness and precision of beamforming depends on the number of independently addressable speakers, and therefore, of system complexity. Usually, the greater the number of speakers and amplifiers, the better beamforming capabilities will be. The feasibility of complex systems, however, is subject to technical and economic constraints. The directionality of acoustic beams is further dependent on the frequency range of the signal. Low-frequency components are less directional than higher-frequency components, thereby impacting sound fidelity.

Accordingly, there is a need for speaker systems and sound-reproducing methods which achieve high-fidelity beamforming without unduly increasing system complexity.

SUMMARY OF THE INVENTION

The present invention employs, in various embodiments, continuous speaker membranes to increase beamforming capabilities while reducing complexity and cost. A continuous electro-acoustic transducer membrane, combined with two or more independent drivers, facilitates the continuous variation of time delays between vibrations of different parts of the membrane, and, thereby, between acoustic sources at different locations. Effectively, it may improve beamforming performance in a manner similar to an increased number of independent speakers.

The invention further provides, in some embodiments, methods to overcome the directionality limitations associated with low frequencies by using higher harmonics of these low frequencies in the signals sent to the speakers. This further increases the sound reproduction performance of acoustic beamformers.

In a first aspect, the invention provides, in various embodiments, a system for acoustic beamforming that contains an elongated, continuous electro-acoustic transducer membrane and a plurality of spaced-apart drivers disposed along the length of the transducer. In some embodiments, the transducer membrane takes the form of a ribbon, i.e., a flat or corrugated sheet whose length is significantly larger than its width. Each driver applies a time-varying signal with an associated time delay to an adjacent region of the transducer membrane; the time delays imposed by the various drivers are independent from one another. A driver, as the term is used herein, may be any element or combination of elements that takes an electrical signal as an input, and excites vibrations of the membrane in accordance with the signal. Drivers include, for example, electromagnets and piezoelectric elements affixed to the membrane and imparting mechanical vibrations thereto, as well as electric circuitry that applies an input signal to various electrically conductive regions of a membrane suspended within a magnetic field. In some embodiments, the system further includes one or more electrical amplifiers that supply the signal to the drivers via output channels, each of which is associated with a certain time delay. Moreover, some systems may include two or more continuous electro-acoustic transducer membranes, and corresponding sets of drivers disposed along the membranes.

In another aspect, the invention relates to a method of acoustic beamforming. In various embodiments, the method involves providing an elongated, continuous electro-acoustic transducer membrane, and driving the transducer at a plurality of spaced-apart regions along its length according to a time-varying signal and time delays associated with the regions. The systems and components described above may be utilized in connection with this aspect of the invention. Since additional speakers may further increase beamforming performance, various embodiments of the method involve providing and driving at least a second continuous electro-acoustic transducer membrane with a time-varying signal having time delays associated with different regions of the membrane.

In yet another aspect, the invention provides a method for acoustic beamforming with improved directionality. Embodiments of the method involve receiving a multi-frequency signal that represents sound, separating out low-frequency components from the signal, and generating higher harmonics, i.e., frequency-multiples, of the low-frequency components. These higher harmonics are then combined with the multi-frequency signal, which may (but need not) include the original low-frequency components, to form an edited multi-frequency signal. The edited multi-frequency signal is supplied to a plurality of speaker drivers with various time delays. In some embodiments, the acoustic beamforming results in stereophonic sound.

BRIEF DESCRIPTION OF THE DRAWINGS

The foregoing discussion will be understood more readily from the following detailed description of the invention when taken in conjunction with the accompanying drawings.

DETAILED DESCRIPTION OF THE INVENTION

1. Speaker Array for Acoustic Beamforming

Figure 1:
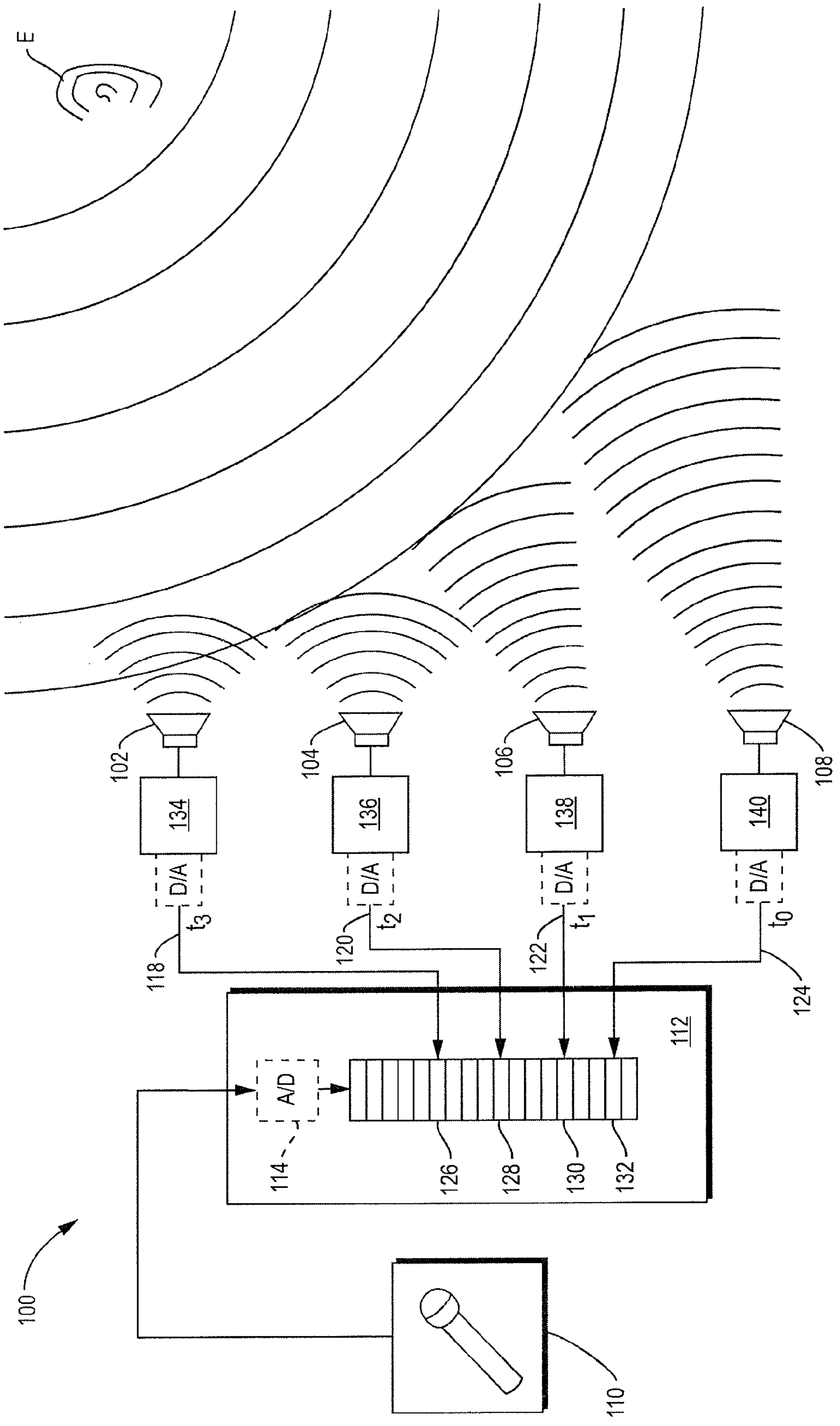
FIG. 1 is a schematic diagram illustrating a beamforming system with multiple speaker drivers in accordance with one embodiment of the invention.

In various embodiments, sound reproduction systems in accordance with this invention employ arrays of speakers to produce sound. In particular embodiments, the sound frequencies are within the audible range, i.e., between about 15 Hz and about 20 kHz; however, the invention can also be applied to subsonic (<15 Hz) and ultrasonic (>20 kHz) frequencies. The speakers may be fed from a single audio source, but are driven so as to produce regions of constructive interference: each speaker transmits sound delayed by an amount of time which is inversely proportional to its distance from a selected point or region in space (hereafter also referred to as the target). As a result of these delays, the wave fronts from all the speakers arrive at the target at the same time and approximately in phase. Consequently, their amplitudes add algebraically. Since sound intensity or volume is a function of the square of the signal amplitude, very significant sound intensities at the target can be achieved for reasonably sized arrays with speakers set to low volume.

In some embodiments, the audio output of the individual speakers may even be below the audible threshold, such that the output from any given speaker cannot be heard. However, if each speaker has its output delayed such that the sound waves from all the speakers reach the target at the same moment in time, the audio volume at that location will be increased in proportion to the square of the number of speakers employed in the array. Thus, with a sufficient number of speakers producing inaudible volume levels of sound, the sound at the target will be readily audible. At the other locations in the auditory space, the sound waves will generally arrive with different phases, and therefore not interfere constructively. This simple technique allows sound to be focused into a target location within the room or other auditory space, while avoiding noise disturbances in the surrounding space.

A conventional measure of sound volume, which corresponds roughly to the psychological "loudness" of sound, is the decuple of the decade logarithm of the ratio between the volume of the sound in question and a reference volume, assigned units of decibels (dB). The reference volume is chosen to be a barely perceptible sound volume, i.e., the audibility threshold of the volume. Therefore, a sound right at the audibility threshold has a "loudness" of 0 dB. Since human perception of sound scales logarithmically, sound intensities measured in decibels are proportional to the perceived loudness. For example, a sound of 20 dB appears twice as loud as a sound of 10 dB, while the corresponding intensities differ by a factor of ten.

The array of speakers can be arranged in one, two, or three dimensions. For example, the speakers may be integrated into a wall or ceiling, or distributed randomly within a room. The time delays of the audio signals for each speaker may be calculated with respect to the delay of the speaker farthest away from the target location, which may be set to any constant, e.g., zero. The difference between the maximum distance and the distance between any particular speaker and the target is divided by the speed of sound, which is approximately 340 m/s (~1100 feet per second) in air, to yield the required time delay for that speaker. In addition to the delay, the amplitude of the sound output of each speaker may be chosen to be proportional to the distance of the speaker from the target in order to compensate for the linear decrease of the sound amplitude with distance from the source.

FIG. 1 illustrates an exemplary system 100 implementing the concepts described above in accordance with one embodiment of the invention. The system 100 includes four representative speakers 102, 104, 106, 108, arranged in a linear array. The first speaker 102 is closest to a target represented by a listener's ear E. The second speaker 104 is slightly more distant, and the third and fourth speakers 106, 108 are still more distant. A single audio source 110 provides a time-varying audio drive voltage. In a delay line 112, the drive voltage is split up into multiple channels supplying the speakers 102, 104, 106, 108, and an appropriate time delay is introduced in each channel based on the location of the corresponding speaker. For example, the speaker 108 farthest away from the target 102 may be fed a signal with time delay $t_0$ (which may be zero), and speakers 106, 104, 102 receive signals delayed by successively larger time delays $t_1$, $t_2$, $t_3$.

Typically, the drive voltage, if originally analog, is converted to a digital signal in an AD converter 114 by sampling at, e.g., a frequency of 44 kHz. The time delays may be implemented with logic gates in an application specific standard product (ASSP), or in any other integrated circuit. For example, the digital signal, corresponding to audio amplitudes at a series of points in time, may be stored in a memory stack 116 of a digital signal processor (DSP) such as the BLACKFIN from Analog Devices Inc., or, alternatively, of the random-access memory (RAM) of a general purpose computer (as illustrated in FIG. 1). The computer controls pointers 118, 120, 122, 124 for the speakers 102, 104, 106, 108, which are directed to particular memory registers 126, 128, 130, 132 that are read out in synchronization with the stack 116 being incremented. In alternative embodiments (not shown), the system 100 may be adapted to use an analog drive voltage by implementing the time delays in an analog delay line 112. The delayed signals are amplified in amplifiers 134, 136, 138, 140, which may, for instance, be Class-D amplifiers. Digital signals are converted to analog signals prior to amplification. By using digital-input amplifiers, signal conversion and amplification may be combined. In some embodiments, the amplifiers for several speakers may be combined into one circuit. Since, typically, the different speakers 102, 104, 106, 108 are driven with different linear combinations of two (stereo) signals, the speaker driver inputs may be shared between multiple amplifier channels if the devices are integrated. Further, in certain embodiments, the imposition of delays may be combined with signal amplification in one device, e.g., in a Class-D amplifier with additional digital circuitry implementing the delays.

2. Continuous Electro-Acoustic Transducer Membrane

The performance of beamforming systems increases generally with the number of speakers. Ideal performance would be achieved with an infinite number of speakers. A continuous ribbon speaker membrane amounts to a finite linear arrangement of an infinite number of speaker elements. However, in a conventional sound reproduction system, the continuous membrane vibrates as a whole according to one time-varying signal. It therefore acts as a single line source of sound pressure waves, not as a number of independent point sources of sound.

Various embodiments of the present invention utilize elongated, continuous speaker membranes driven by two or more independent drivers. These drivers impart an audio waveform on the membrane with different time delays depending on the distance between the respective portion of the membrane and the target. Thereby, they allow for the control of the wave fronts of sound emanating from the membrane.

Figure 2B:
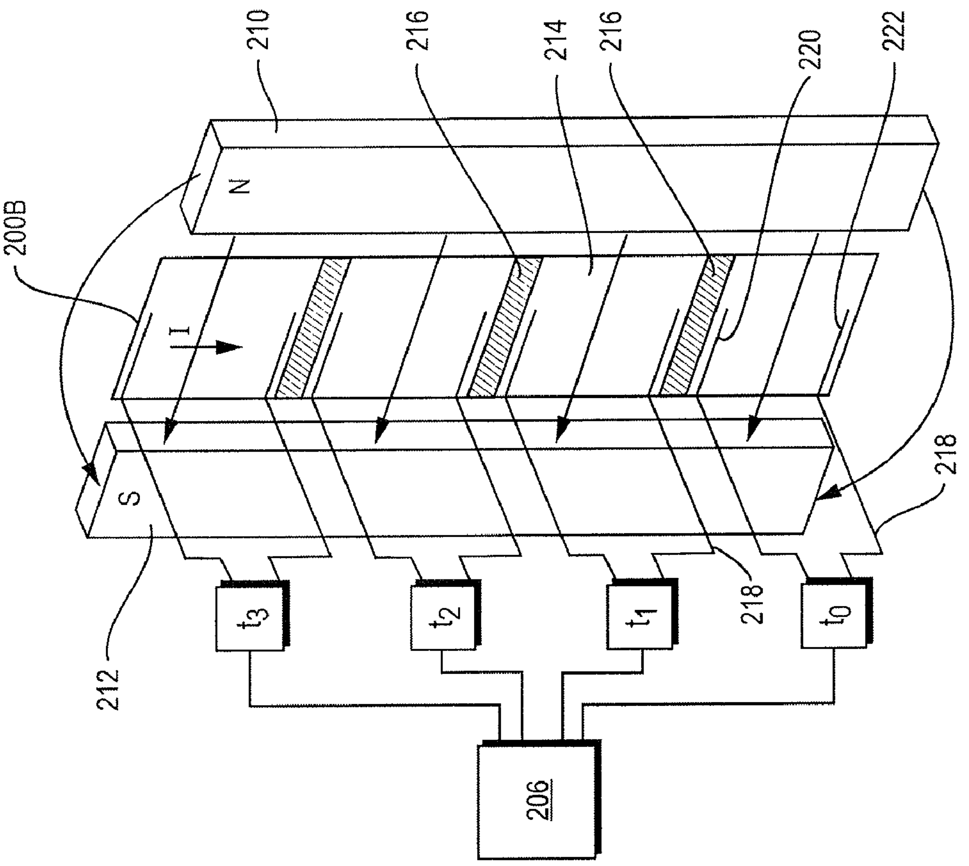
FIGS. 2A and 2B are schematic diagrams illustrating beamforming systems containing a continuous ribbon-shaped membrane according to some embodiments.
Figure 2A:
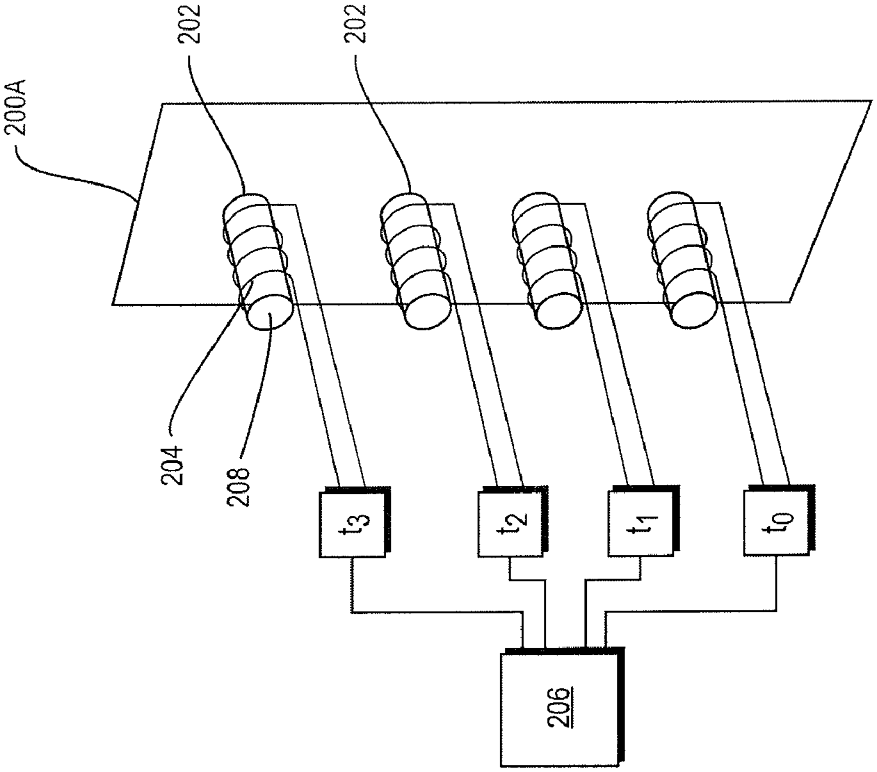

FIG. 2 illustrates two exemplary embodiments of a system containing a continuous, ribbon-shaped membrane 200 and four drivers placed along its length. The system shown in FIG. 2A utilizes a series of electromagnetic drivers 202 each including an electromagnet 204 fed by an electrical signal from the amplifier 206, and an adjacent permanent magnet 208 fastened to the membrane 200A. Via the magnetic field of the electromagnet, the electrical input signal causes back-and-forth motion of the permanent magnet, and, consequently, vibrations of the portion of the membrane attached thereto. In an alternative embodiment (not shown), the electromagnetic drivers are replaced by piezoelectric drivers mechanically connected to the membrane. The membrane may be manufactured from conventional loudspeaker diaphragm materials, such as paper, plastics, or metal.

FIG. 2B illustrates a system based on a thin, continuous ribbon membrane 200B suspended in a strong magnetic field, and capable of conducting an electrical current I in the longitudinal direction of the membrane 200B. Suitable membrane materials include, for example, aluminum, other metals or alloys, and conductive plastics. The magnetic field is oriented with its field lines in the transverse direction of the membrane, and may, for instance, be created by two elongated pole pieces 210, 212, each on one side of the membrane 200B. As current is driven through the membrane, the resulting Lorentz force causes the membrane to vibrate in the direction perpendicular to its surface area. In various embodiments, the membrane includes electrically conductive sections 214 separated by narrow electrically isolating sections 216. Electrical circuitry 218 connects each conducting section 214 with an output channel of an amplifier 206. In one embodiment, two wires 220, 222, corresponding to the plus and the minus pole of the amplifier output, may be connected to the conducting membrane section 214 at opposite ends, i.e., with one wire connected to the conducting section close to one adjacent isolating section 216, and the other wire close to the other adjacent isolating section 216. Due to the isolating sections 216, each conductive section 214 can be driven independently.

Figure 3B:
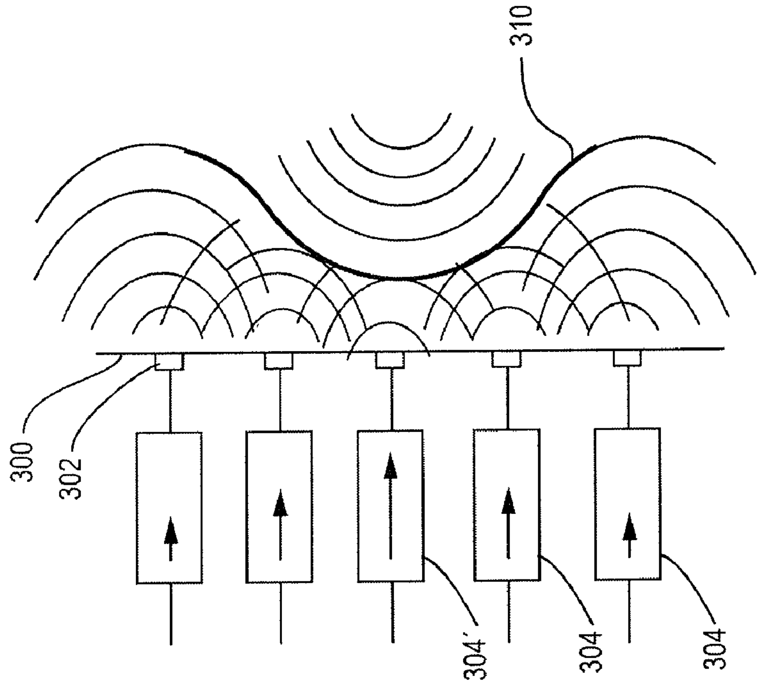
FIGS. 3A-3C are schematic diagrams illustrating a method of using continuous membranes and drivers with various time delays for acoustic beamforming according to some embodiments.
Figure 3A:
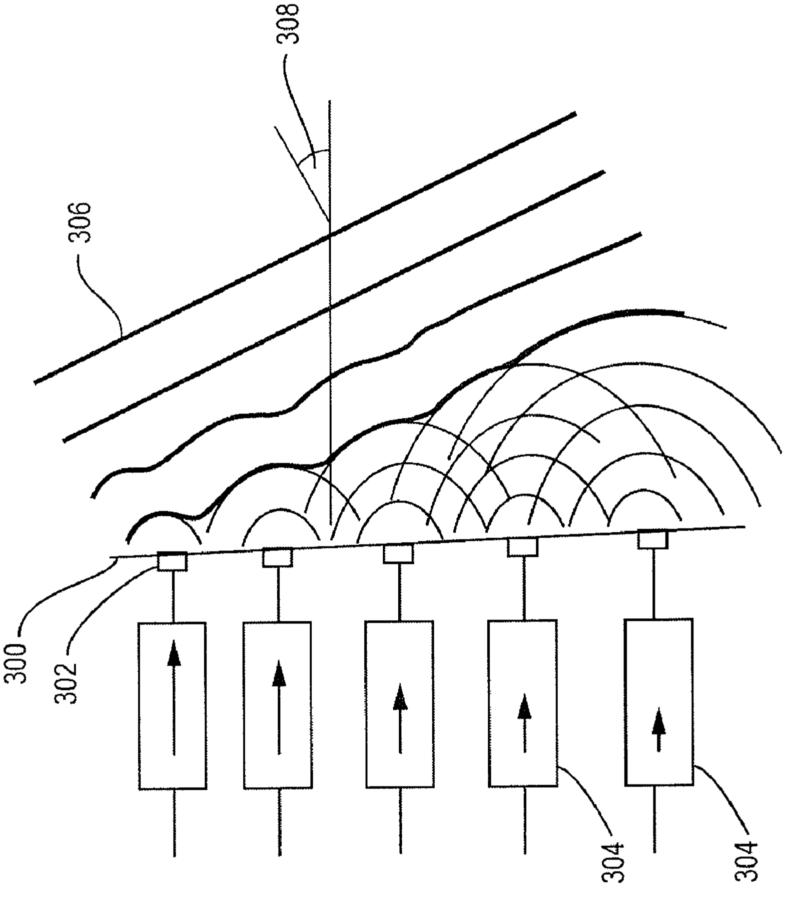
Figure 3C:
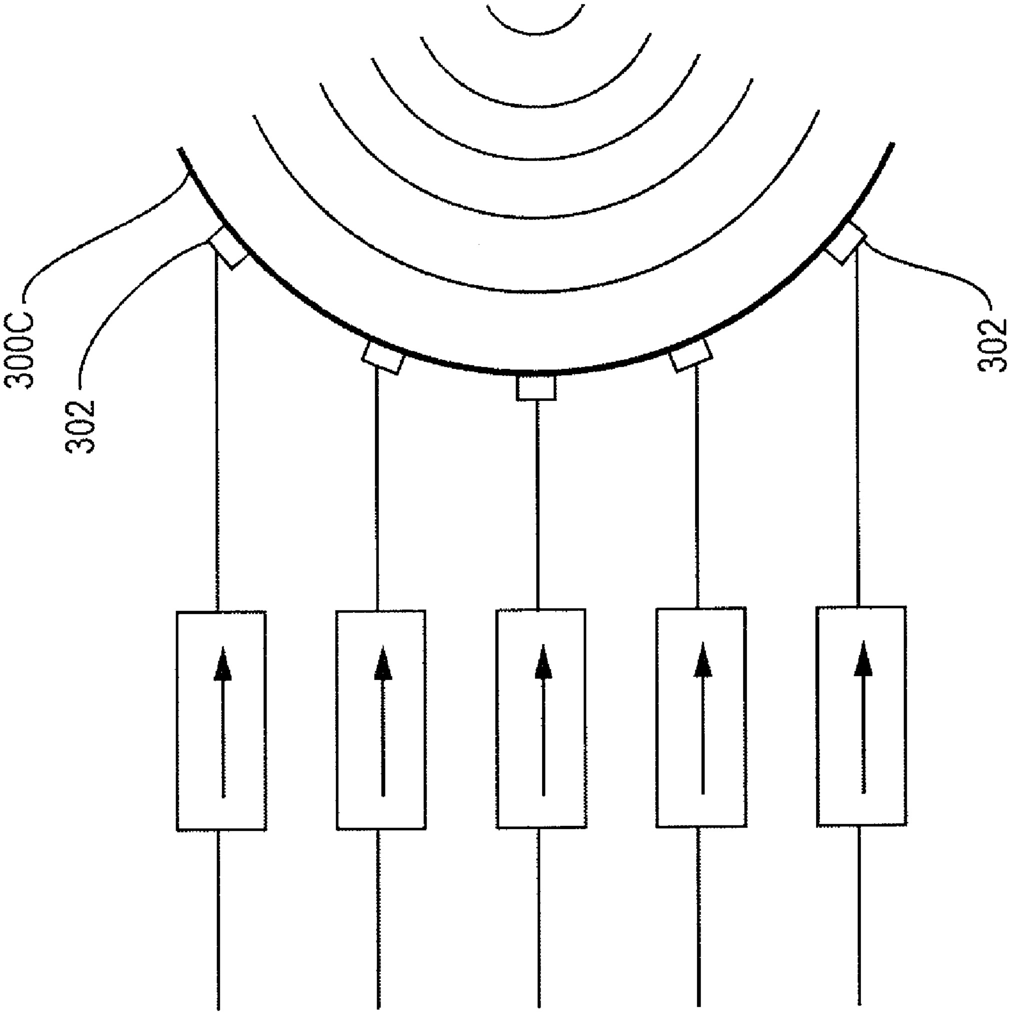

FIGS. 3A-3C illustrate the direction of sound emanating from a continuous ribbon-shaped membrane for three configurations of the membrane and the time delays of driver elements along the membrane. In FIGS. 3A and 3B, the ribbon 300 is straight. If all drivers 302 were in phase, the resulting wave front would be parallel to the membrane, propagating in the direction normal to the membrane. If, however, each driver receives a signal shifted by a time interval proportional to its distance from a first driver, as indicated by the time-delay arrows in the delay elements 304 of FIG. 3A, the wave front 306 is tilted with respect to the membrane 300, and propagates along an angle 308 to the normal direction. In FIG. 3B, the driver signals are advanced with respect to a centrally located driver 304' by a time interval that increases with the distance from the central driver 304'. This set of delays results in a curved wave front 310 which focuses at a certain distance from the membrane 300. The same wave front can be achieved with the embodiment illustrated in FIG. 3C, wherein the ribbon membrane 300C itself is curved, and is driven by drivers 302 in phase with each other.

Additional embodiments may combine features of the exemplary embodiments described above, and may include one, two, or several continuous membranes. The various drivers along one membrane may receive their signals from one or more amplifiers, and one amplifier may supply signals to one or more membranes. Further, membrane shapes are not necessarily limited to ribbons, but may, e.g., include rectangular geometries; and driver arrangements behind a membrane may be one-dimensional or two-dimensional.

3. Beamforming with Improved Directionality

Figure 4:
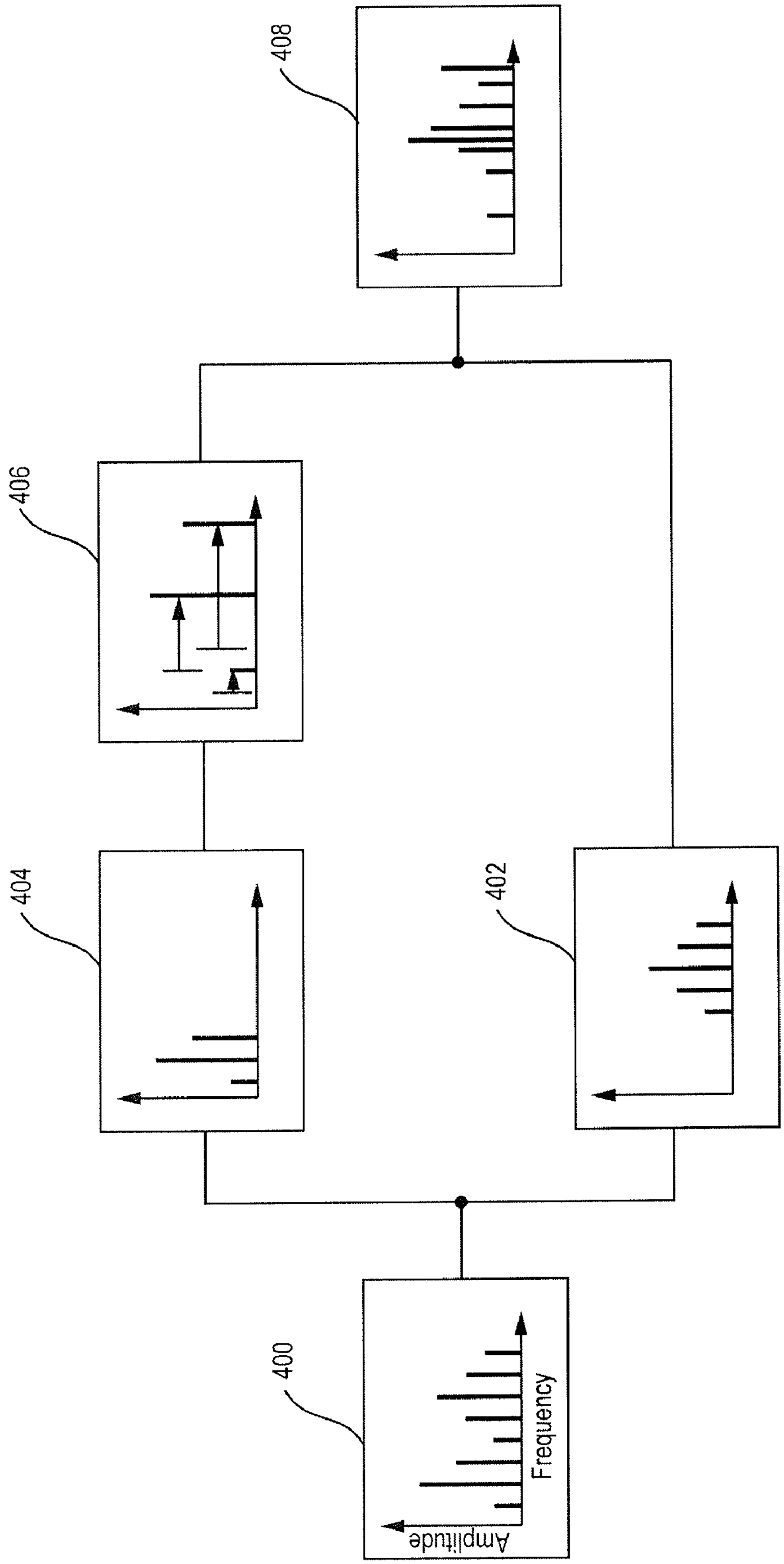
FIG. 4 is a conceptual depiction of a method for enhancing directionality according to one embodiment of the invention.

The divergence of acoustic beams increases with decreasing sound frequency, limiting the directionality of sound with low-frequency components. This problem can be circumvented by utilizing higher harmonics, i.e., integer multiples, of the low-frequency components, as illustrated conceptually in FIG. 4. A multi-frequency audio-signal 400 is separated into medium-frequency and high-frequency components 402 and low-frequency components 404. The low-frequency components 404 are subsequently shifted to integer multiple frequencies that fall into the medium-frequency to high-frequency range. These "higher harmonics" 406 contain in essence the same sound information as the original low-frequency components. The original medium-frequency and high-frequency components 402 are combined with the higher harmonics 406 to form the edited multi-frequency signal 408, which may then be supplied to a sound reproduction and beamforming system such as, e.g., the ones illustrated in FIGS. 1 and 2. The resulting sound exhibits better focusing properties and directionality than the original signal. While the edited audio signal 408 is, strictly speaking, not a true reproduction of the original, the perceived sound quality may be as high or even higher than that of the original sound 400.

The method described above can be implemented in a variety of ways. For example, the audio signal 400 may be digitized, and the filtering, generation of higher harmonics, and signal addition may be carried out by a computer or other digital signal processing system, such as on a Sigma DSP. The edited digital signal may then be converted into an analog signal, amplified, and supplied to the drivers of a beamforming system. In an alternative embodiment, the original signal passes through an electronic filter separating out a low-frequency band, and the generation of higher harmonics is accomplished through analog non-linear electronic circuits. An exemplary circuit diagram implementing this functionality is, for example, illustrated in FIG. 7 of U.S. patent application Ser. No. 11/257,123, filed Oct. 25, 2005, which is hereby incorporated by reference in its entirety.

4. Applications

Figure 5:
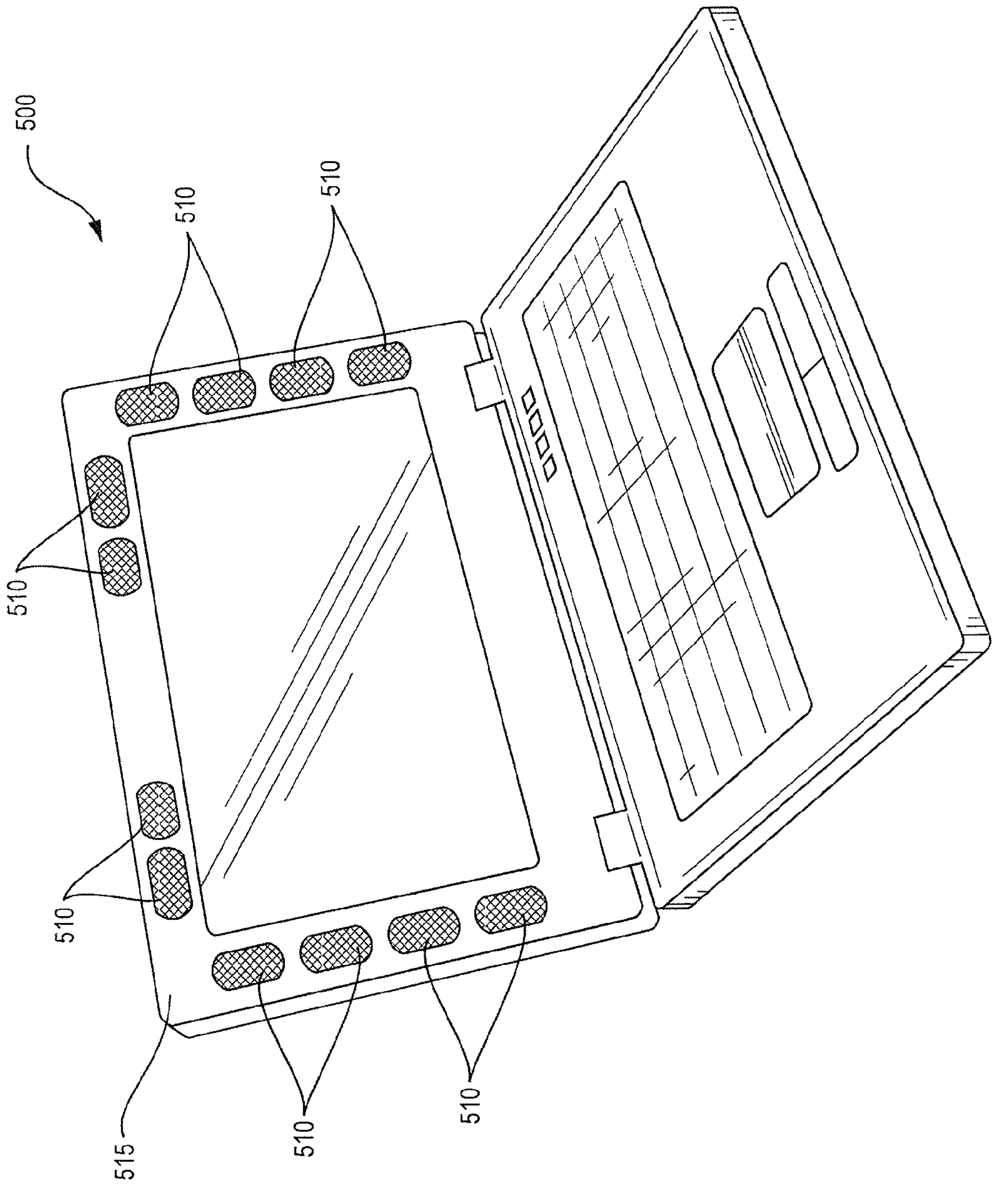
FIG. 5 schematically depicts an exemplary electronic device incorporating a speaker system according to one embodiment of the invention.

Beamforming systems and methods as described above may be employed in a variety of stationary and mobile settings. For instance, a set of speakers may be fixedly arranged in one, two, or three dimensions in a room, such as a living room or a museum hall, and may be driven to focus sound into a particular area within that room, e.g., above a sofa in the living room, or in front of an exhibit in the museum. Thereby, sound is delivered to a desired location, and disturbance to people outside that region is minimized. Beamforming systems may also be integrated into portable devices, such as laptops, PDA'S, handheld game consoles, speaker phones, portable CD players, etc. FIG. 5 illustrates a laptop 500 with twelve representative speaker membranes 510 built into the screen frame 515. A user may adjust the time delays between the various speakers such as to maximize sound intensity for herself, which corresponds to the maximization of constructive interference at the position of the user's ears, as she operates the laptop 500. Persons in the surrounding area are subject to much lower sound levels as a consequence of destructive interference. In this manner, beamforming systems allow users of portable devices to enjoy their devices' audio features in public without the need to wear earphones to avoid disturbing others.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A system for acoustic beamforming, comprising:

(a) an elongated, continuous electro-acoustic transducer membrane having a length; and (b) a plurality of spaced-apart drivers disposed along the length of the transducer, the drivers each independently driving an adjacent region of the transducer according to a time-varying signal applied thereto with an associated time delay.

2. The system of claim 1 wherein the electro-acoustic transducer membrane is substantially ribbon-shaped.

3. The system of claim 1 wherein the drivers are electromagnetic drivers.

4. The system of claim 1 wherein the drivers are piezoelectric drivers.

5. The system of claim 1 wherein the electro-acoustic transducer membrane is suspended in a magnetic field and comprises electrically conductive sections.

6. The system of claim 1 further comprising at least one electrical amplifier for supplying the time-varying signal to the drivers via output channels each associated with a time delay.

7. The system of claim 1 further comprising at least a second elongated, continuous electro-acoustic transducer membrane having a length and a second plurality of spaced-apart drivers disposed along the length of the second transducer, the second membrane and second drivers cooperating with the other membrane and the other drivers so as to enhance the beamforming performance thereof.

8. A method for acoustic beamforming with improved directionality, the method comprising:

(a) receiving a multi-frequency signal representing sound;

(b) separating out low-frequency components from the signal, and generating higher harmonics of the low-frequency components;

(c) combining the multi-frequency signal with the higher harmonics to form an edited multi-frequency signal; and (d) supplying the edited multi-frequency signal to a plurality of speaker drivers with various time delays.

9. The method of claim 8 wherein the edited multi-frequency signal comprises the low-frequency components.

10. The method of claim 8 wherein the edited multi-frequency signal lacks the low-frequency components.

11. The method of claim 8 wherein the acoustic beamforming results in stereophonic sound.

12. A method of acoustic beamforming, the method comprising the steps of:

(a) providing an elongated, continuous electro-acoustic transducer membrane having a length; and (b) driving the transducer at a plurality of spaced-apart regions along the length according to a time-varying signal and time delays associated with the regions.

13. The method of claim 12 wherein the electro-acoustic transducer membrane is substantially ribbon-shaped.

14. The method of claim 12 wherein the drivers are electromagnetic drivers.

15. The method of claim 12 wherein the drivers are piezoelectric drivers.

16. The method of claim 12 wherein the electro-acoustic transducer membrane is suspended in a magnetic field and comprises electrically conductive sections.

17. The method of claim 12 further comprising:

(c) providing a second elongated, continuous electro-acoustic transducer membrane having a second length; and (d) driving the second transducer membrane at a plurality of spaced-apart regions along the second length according to the time-varying signal and time delays associated with the regions.

* * * * *